United States Patent [19]
Baker et al.

[11] Patent Number: 5,696,898
[45] Date of Patent: Dec. 9, 1997

[54] SYSTEM AND METHOD FOR DATABASE ACCESS CONTROL

[75] Inventors: Brenda Sue Baker; Eric Grosse, both of Berkeley Heights, N.J.

[73] Assignee: Lucent Technologies Inc., Murray Hill, N.J.

[21] Appl. No.: 469,342

[22] Filed: Jun. 6, 1995

[51] Int. Cl.$^6$ .................................................. G06F 11/00
[52] U.S. Cl. ........................ 395/187.01; 395/188.01; 395/609
[58] Field of Search ................... 395/186, 187.01, 395/188.01, 650, 609; 364/253.1, 253.2, 286.4, 286.5; 380/23, 25

[56] References Cited

U.S. PATENT DOCUMENTS

| | | | |
|---|---|---|---|
| 4,652,990 | 3/1987 | Pailen et al. | 364/200 |
| 4,924,378 | 5/1990 | Hershey et al. | 395/187.01 |
| 5,339,403 | 8/1994 | Parker et al. | 395/425 |
| 5,375,244 | 12/1994 | McNair | 395/187.01 |
| 5,388,211 | 2/1995 | Hornbuckle | 395/186 |
| 5,388,212 | 2/1995 | Grune et al. | 395/186 |
| 5,390,297 | 2/1995 | Barber et al. | 395/186 |
| 5,448,731 | 9/1995 | Wang et al. | 395/186 |
| 5,469,576 | 11/1995 | Dauerer et al. | 395/186 |
| 5,479,612 | 12/1995 | Kenton et al. | 395/186 |
| 5,483,658 | 1/1996 | Grube et al. | 395/186 |
| 5,550,984 | 8/1996 | Gelb | 395/197.01 |

OTHER PUBLICATIONS

Nueman, "Proxy–Based Authorization And Accounting For Distributed Systems", Distributed Computing Systems, 1993 IEEE Conf. pp. 283–291 Jan. 1993.

Stempel, "Ipaccess–An Internet Service Access System For Firewall Installations", 1995 Network and Distributed System Security, IEEE pp. 31–41 Feb. 1995.

Yu, "Access Control And Authorization Plan For Customer Control Of Network Services", GlobeCom 1989, IEEE pp. 862–869 1989.

O'Mahomy, "Security Considerations In A network Management Environment", IEEE Network Magazine, 1994, pp. 12–17 May 1994.

White, Fisch and Pooch, "Computer System And Network Security", CRC Press 1995, pp. 37–89, 155–187 1995.

National Computer Security Center, "A Guide To Understanding Discretionary Access Control In Trusted Systems" pp. 1–30 Sep. 1987.

"The Little SchoolHouse Logs On", PC Magazine p. 62 Feb. 1995.

"The Rating Game", Stanford Observer, p. 13 1995.

"Surf–Watch Worl Web Homepage" 1995 SurfWatch Software Inc. ;obtained at Interbet address http://www.surfcom/index.html. on Jun. 6, 1995.

Lunde, "Re: Parental Control: A Proposed Addition to HTTP" Article 1060 of comp.infosystems.www. servers.unix newsgroup on the World Wide Web, May 29, 1995.

*Primary Examiner*—Robert W. Beausoliel, Jr.
*Assistant Examiner*—Joseph E. Palys
*Attorney, Agent, or Firm*—James A. DiGiorgio

[57] ABSTRACT

A system and method for selectively controlling database access by providing a system and method that allows a network administrator or manager to restrict specific system users from accessing information from certain public or otherwise uncontrolled databases (i.e., the WWW and the Internet). The invention employs a relational database to determine access rights, and this database may be readily updated and modified by an administrator. Within this relational database specific resource identifiers (i.e., URLs) are classified as being in a particular access group. The relational database is arranged so that for each user of the system a request for a particular resource will only be passed on from the local network to a server providing a link to the public/uncontrolled database if the resource identifier is in an access group for which the user has been assigned specific permissions by an administrator. The invention is implemented as part of a proxy server within the user's local network.

14 Claims, 2 Drawing Sheets

SYSTEM AND METHOD FOR DATABASE ACCESS CONTROL

TECHNICAL FIELD

The invention relates to controlling database access and, more particularly, to selectively providing such control with respect to otherwise public databases.

BACKGROUND OF THE INVENTION

Files or other resources on computers around the world may be made publicly available to users of other computers through the collection of networks known as the Internet. The collection of all such publicly available resources, linked together using files written in Hypertext Mark-up Language ("HTML"), is known as the World Wide Web ("WWW").

A user of a computer that is connected to the Internet may cause a program known as a client to request resources that are part of the WWW. Server programs then process the requests to return the specified resources (assuming they are currently available). A standard naming convention has been adopted, known as a Uniform Resource Locator ("URL"). This convention encompasses several types of location names, presently including subclasses such as Hypertext Transport Protocol ("http"), File Transport Protocol ("ftp"), gopher, and Wide Area Information Service ("WAIS"). When a resource is downloaded, it may include the URLs of additional resources. Thus, the user of the client can easily learn of the existence of new resources that he or she had not specifically requested.

The various resources accessible via the WWW are created and maintained by many different people on computers around the world, with no centralized control of content. As particular types of information or images contained in this uncontrolled information collection may not be suitable for certain users, it may be desirable to selectively restrict access to WWW resources. For example, parents or school teachers might wish to have children access useful information, but not obscene material (which the children may be exposed to as a result of innocent exploration of the WWW, or through the incidental downloading of a URL). Another example is the case of school teachers who would like their students to access just a particular group of resources during a class meeting. A third example is businesses that would like their employees to access only work-related resources, but not to spend their time on other WWW explorations. In general, a particular user might need to be restricted to different resources at different times, as in the case of a student restricted to different sets of resources during classes on different subjects.

Some authorities such as schools ask the users to abide by a policy statement by which they agree to restrict their exploration of the WWW, for example, by agreeing not to download obscene material. However, voluntary compliance with such a policy will not prevent the accidental downloading of resources that are not readily identifiable as forbidden or inappropriate prior to downloading and viewing.

Naturally, technical solutions such as "firewalls" are also available to limit or impede access to the WWW and Internet. These firewalls are software-based gateways that are commonly installed to protect computers on a local area network ("LAN") from being attacked by outsiders. One effect of installing a firewall is that WWW clients can no longer directly contact WWW servers. Typically, this proves too restrictive, and users resort to "proxy servers" that are directly contacted by WWW clients. These proxy servers have special abilities to forward requests through the firewall, and thereby provide communication to and from servers on the Internet. For efficiency, a proxy server may also cache some resources locally. Current clients and proxy servers yield access to every public resource in the WWW— They are not configured to allow a particular user to request some resources, while preventing access by that user to other resources.

Some "filtering" of the available WWW resources may be effected within systems that offer indirect access. In these systems an information provider would download resources from the WWW and maintain copies of the resources. Users would access these copies. The information provider can review the resources as they are obtained from the WWW, and edit out any inappropriate or obscene material prior to making the resource available to users. A disadvantage of this scheme is that the material provided by the information provider may be out-of-date compared to the original resource on the WWW.

In an alternate scheme of "filtered" access to WWW resources, a proxy server provides a user with a menu of allowed resources that may be accessed, and users can obtain any resources that can be reached by a series of links from the menu resources. The user is only permitted to request URLs via this menu. This particular method has two disadvantages. First, many resources must be excluded from the menu because they contain links to inappropriate material, even though they themselves might be acceptable. Second, a resource may change over time to include new links that might lead to inappropriate material, and thereby provide a user with an unintended pathway of access to such.

In still another method of "filtered" access to WWW resources, the client or proxy server checks each resource for a list of disallowed words (i.e.; obscenities; sexual terms, etc.) and shows the user only those resources that are free of these words. However, this method does not permit filtering of images and does not prohibit resources that might be inappropriate due to content other than specific words.

Yet another means of protecting users from inappropriate or obscene materials has been established by the computer and video game manufacturers. The games are voluntarily rated on the dimensions of violence, nudity/sex, and language. Although such conventions have not yet been adopted in the WWW, the analog would be to add such ratings to WWW resources, presumably with digital signatures to prevent forgery. A WWW client could then, if so programmed, choose not to save or display any resource that is unrated or has an unacceptable rating for the given audience. The disadvantage of this scheme is the need to convince the many people who provide useful servers (often on a non-professional or pro bono basis) to coordinate with a rating panel.

All of the present systems for limiting user access to an uncontrolled public database resources, such as those available on the WWW, have obvious shortcomings. Presently, there exists no simple means for an authority (i.e.; teacher, supervisor, system administrator, etc.) to selectively control WWW access by one or more users, without significantly impairing the users' ability to communicate with the Internet.

SUMMARY OF THE INVENTION

The present invention overcomes the deficiencies of prior schemes for selectively controlling database access by providing a system and method that allows a network administrator or manager to restrict specific system users from accessing information from certain public or otherwise uncontrolled databases (i.e., the WWW and the Internet). The invention employs a relational database to determine access rights, and this database may be readily updated and modified by an administrator. Within this relational database specific resource identifiers (i.e., URLs) are classified as being in a particular access group. The relational database is arranged so that for each user of the system a request for a particular resource will only be passed on from the local network to a server providing a link to the public/uncontrolled database if the resource identifier is in an access group for which the user has been assigned specific permissions by an administrator. The invention is implemented as part of a proxy server within the user's local network.

DETAILED DESCRIPTION OF THE INVENTION

Figure 1:
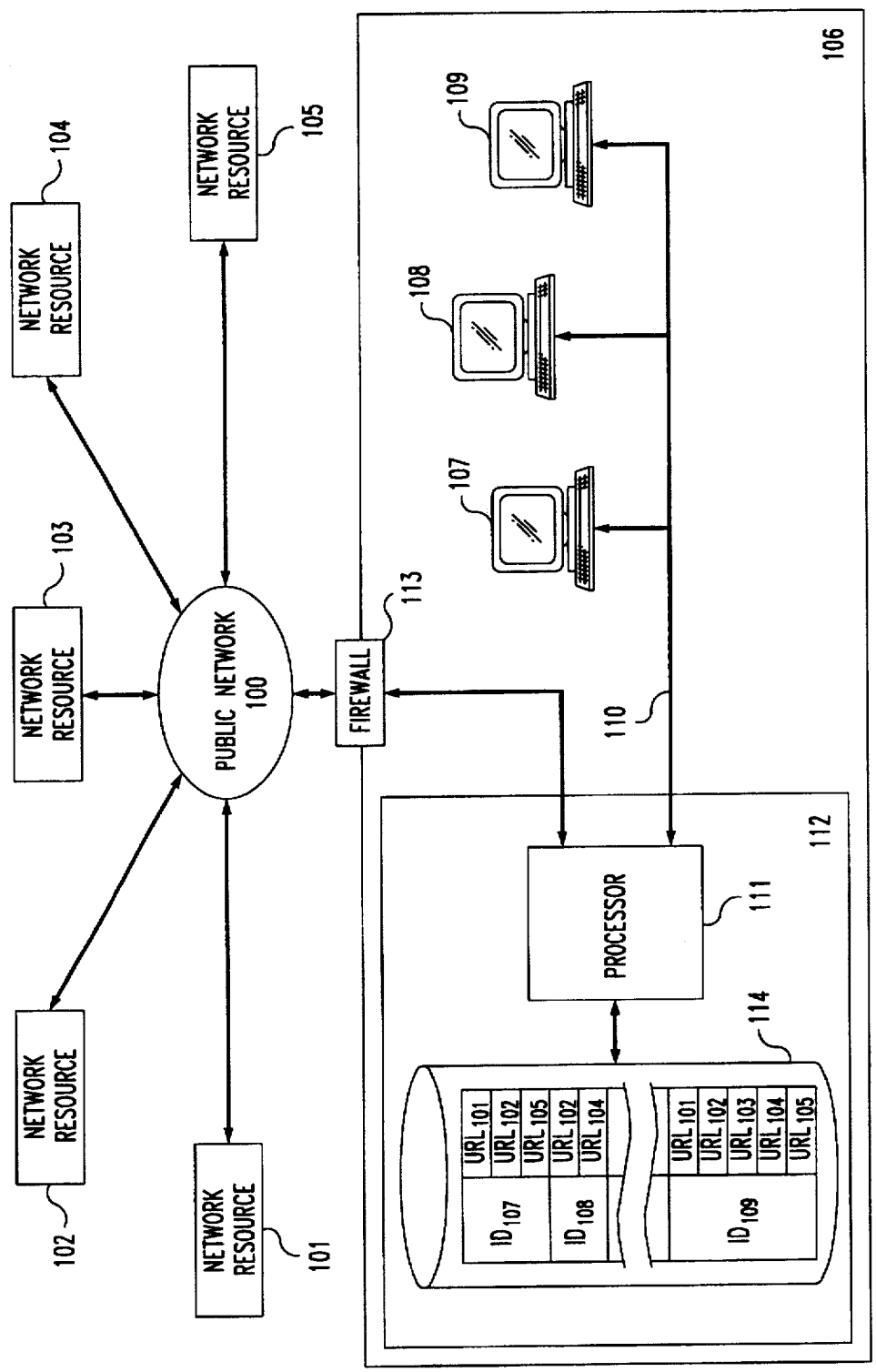
FIG. 1 is a simplified diagram of an exemplary system embodying the invention.

FIG. 1 is a simplified diagram of an exemplary system embodying the invention. As shown, the system includes public network 100, network resources 101–105, and user site 106. Particular users at user site 106 gain access to public network 100 via user terminals 107, 108 and 109. Each of these user terminals is linked by local area network ("LAN") 110 to processor 111 within proxy server 112. Finally, proxy server 112 provides a connection from processor 111 to public network 100 via firewall 113.

Requests from user terminals 107–109 for access to network resources (101–105) through public network 100 are submitted to processor 111 within proxy server 112. In this particular embodiment of the invention, the submitted requests are assumed to be in the form of URLs. As is well known in art, when URLs are submitted to a proxy server, the particular requesting user terminal is identified to the proxy server by an identification header attached to the URL. For the System shown in FIG. 1, the identification code for user terminal 107 is $ID_{107}$, the identification code for user terminal 108 is $ID_{108}$, and the identification code for user terminal 109 is $ID_{109}$. In addition, within the system of FIG. 1, URLs designated as $URL_{101}$, $URL_{101}$, $URL_{103}$, $URL_{104}$ and $URL_{105}$, represent requests for information from network resources 101, 102, 103, 104 and 105, respectively.

Upon receipt of an incoming URL, processor 111 is programmed to determine the identity of the requesting user terminal from the URL header. This identification information is then utilized by processor 111 to cross-reference the received URL with information stored in relational database 114. Relational database 114 contains a listing of user terminal identification codes ($ID_{107}$, $ID_{108}$ ... $ID_{109}$), each of which is associated with one or more URL designations. This relational listing specifies the particular URLs that may be transmitted from a given user terminal to access network resources. As shown, the allowable URLs for user terminal 107 are $URL_{101}$, $URL_{102}$ and $URL_{105}$; the allowable URLs for user terminal 108 are $URL_{102}$ and $URL_{104}$; and the allowable URLs for user terminal 109 are $URL_{101}$, $URL_{102}$, $URL_{103}$, $URL_{104}$ and $URL_{105}$. The information stored in relational database 114 would be under the control of some resident authority at user site 106 (i.e.; a system administrator, or site supervisor empowered to make determinations as to the various URLs that can be accessed from a given user terminal).

Within the system of FIG. 1, when a requesting user terminal transmits a URL associated with that particular terminal's identification code within relational database 114 to processor 111, the request for information represented by that URL is sent to public network 100. For example, upon receipt of a URL from user terminal 107 requesting information from network resource 102, processor 111 would access relational database 114, and thereby determine that $URL_{102}$ was indeed an allowable request. Following this determination, processor 111 would forward $URL_{102}$ to public network 100 via firewall 113. Contrastingly, if a URL that is not associated with the requesting terminal identification code within relational database 114 is received by processor 111, that request for information is denied. For instance, if $URL_{104}$ is received by processor 111 from user terminal 107, relational database 114 is accessed. Since $URL_{104}$ is not one of the URLs associated with user terminal identification code $ID_{107}$ within relational database 114, processor 111 denies the request for information, and no URL is sent to public network 100.

In the particular embodiment described above, relational database 114 stores a list of user terminal identification codes and the various URLs that each user terminal should be allowed to transmit to public network 100. It will be understood that the invention could be modified so that the list of associated URLs associated with a given user terminal identification code serves as a list of URLs that that particular user terminal is not permitted to contact. This restrictive listing functionality could be readily facilitated by reprogramming processor 111. In addition, the invention could be modified so that the identification codes recognized by processor 111 and stored in relational database 114 are user specific, as opposed to user terminal specific. In other words, the system of FIG. 1 could be modified so that a particular individual using a terminal is identified to the system by a personal password or other identifying code. Access or denial of the transmission of particular URLs is effected by the system as a function of that person's identity, regardless of the particular user terminal they may be utilizing.

Figure 2:
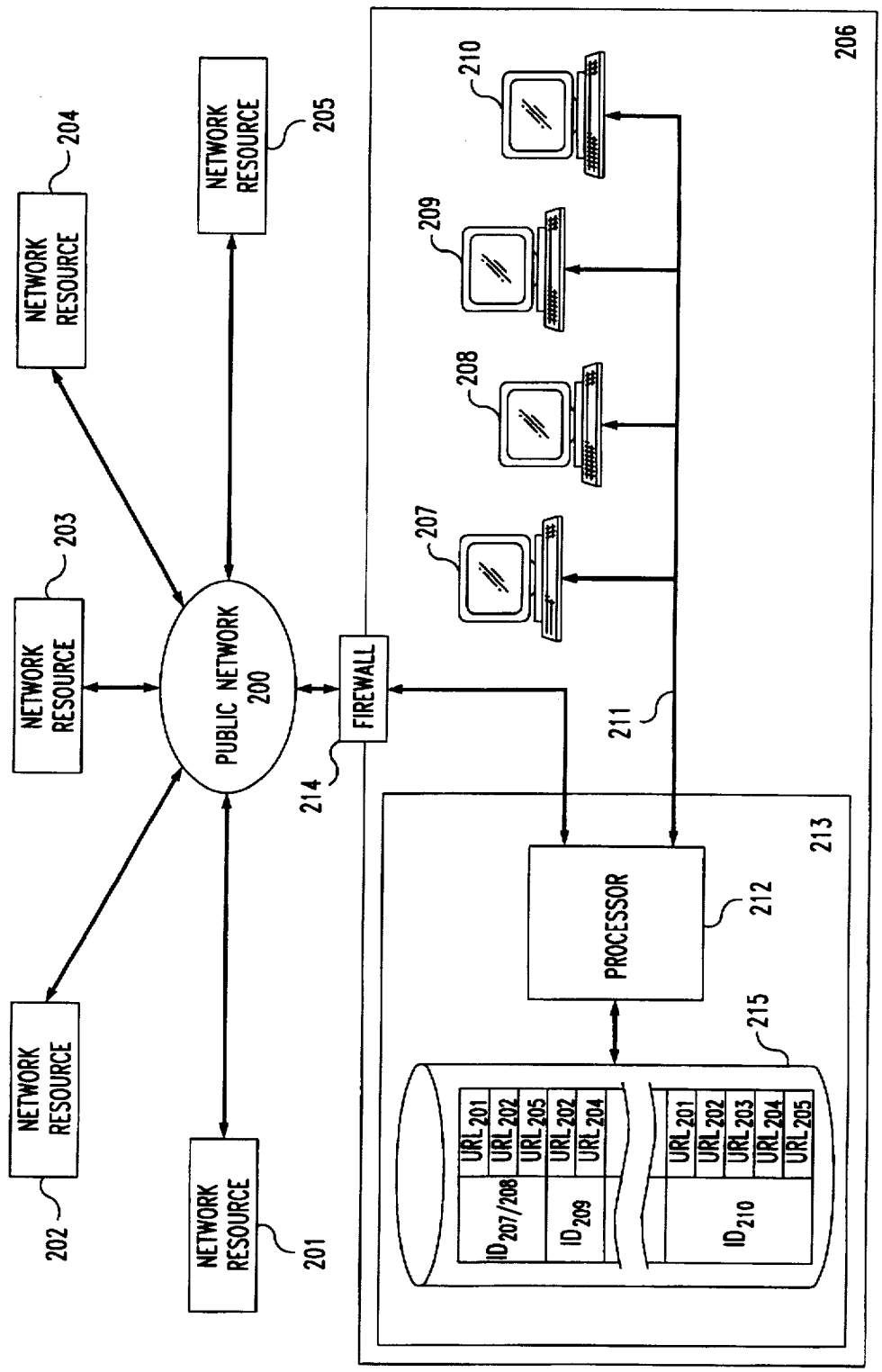
FIG. 2 is a simplified diagram depicting an alternate arrangement of the system of FIG. 1 facilitating the recognition of user/user terminal classes.

The processor and relational database within the proxy server of the invention could also be modified to recognize classes of users and/or user terminals. There could be any number of user terminals or users with a given class accessing the proxy server at a particular user site. When any of the user terminals or users within a given class transmits a URL to the proxy server, the processor within the proxy server accesses the relational database and determine if the specific URL represents an allowable request for a user/user terminal in the identified class. FIG. 2 shows an alternate embodiment of the invention, which is similar to the system illustrated in FIG. 1, that facilitates the recognition of user/user terminal classes. As shown, the system of FIG. 2 includes public network 200, network resources 201–205, user site 206, user terminals 207–210, LAN 211, processor 212, proxy server 213, and firewall 214. The operation of the system of FIG. 2 is substantially similar to that of FIG. 1, however, two of the user terminals, 207 and 208, are grouped in a single class. This grouping is reflected in the configuration of relational database 215. Within relational database 215 the identification code $ID_{207/208}$ for relates to both user terminal 207 and user terminal 208. When a URL from either user terminal 207 or 208 is received at processor 212, the same listing of associated URLs is accessed—Both of these terminals are granted or denied access to the same group of URLs ($URL_{101}$, $URL_{102}$ and $URL_{105}$).

The relational database utilized in systems facilitating the invention could also be configured so that information indicative of allowable resource access is arranged to conform to resources that are configured in a tree structure format. The relational database would include a listing of directory and/or subdirectory identifiers that a particular user or user group would be granted or denied access to. For example, such a system could be implemented for requests formulated as a set of regular expression rules. A regular expression is a string of symbols specifying a set of strings by means of grouping conventions such as parentheses together with special symbols for operations such as repetition and union; regular expressions are well known to people skilled in the art. A regular expression rule consists of a regular expression together with a specification of inclusion or exclusion for one or more users/user terminals. Standard techniques for determining whether a string of symbols matches a regular expression can be applied to determine whether a particular URL matches a regular expression; such techniques are familiar to those skilled in the art.

More generally, the URL http://ourschool.edu/history/* is a regular expression that specifies all resources within the directory http://ourschool.edu/history or its tree of subdirectories (a resource containing information relevant to a particular school's history course). In this case, a notation for regular expressions is employed that is typical of UNIX shell languages, wherein "*" represents any string of symbols, including the empty string. The URL http://ourschool.edu/subject/*answer* specifies any resources within the directory http://ourschool.edu/subject (or its tree of subdirectories) that contain "answer" in their names. Access to the "answer" resources would most likely be restricted to instructors (i.e., students would not be able to view the answers). In order to specify that students be allowed to view "history" resources, but excluded from "history answer" resources, the relational database would store the following with expression rules that would be associated with student identification codes:

+http://ourschool.edu/history/*
−http://ourschool.edu/history/*answer*

The notation "+" indicates a grant of access to a resource, and the "−" indicates a restriction.

Yet another modification of the invention would permit the system to accept requests from users/user terminals that are in a format other than a URL. The relational database would merely have to be modified to store sets of information indicative of the particular type of request format being employed, and associated with a particular user class.

It will be understood that the particular system and method described above is only illustrative of the principles of the present invention, and that various modifications could be made by those skilled in the art without departing from the scope and spirit of the present invention, which is limited only by the claims that follow.

The invention claimed is:

1. A system for selectively controlling network access to one or more resources through a firewall server, the system comprising:

a relational database containing a stored listing of user identification codes and resource identifiers, wherein each of said resource identifiers corresponds to one or more resources accessible via a network, and said stored listing associates each of said user identification codes with one or more of said resource identifiers;

a processor contained within a network proxy server and adapted to receive a request for network access to one or more particular network resources through the firewall server, said request including a user identification code, said processor being further adapted to query said relational database, and execute said request for network access to said one or more particular network resources as a function of said stored listing being indicative of an association between said received user identification code and at least one resource identifier corresponding to said one or more particular network resources, said relational database and said proxy server being operable at a location remote from the firewall server.

2. The invention of claim 1 wherein said processor is programmed to execute said request for access if said stored listing shows said received user identification code to be associated with at least one resource identifier corresponding to said one or more particular network resources.

3. The invention of claim 1 wherein said processor is programmed to deny execution of said request for access if said stored listing shows said received user identification code to be associated with at least one resource identifier corresponding to said one or more particular network resources.

4. The invention of claim 1 wherein access to said one or more particular network resources is effected via a public network.

5. The invention of claim 1 wherein each of said user identification codes identifies one or more terminals adapted for facilitating network access to one or more particular network resources.

6. The invention of claim 1 wherein each of said user identification codes identifies one or more individuals authorized to access one or more particular network resources.

7. The invention of claim 1 wherein each of said resource identifiers corresponds to one or more uniform resource locators for accessing one or more particular network resources.

8. A method for selectively controlling network access to one or more particular resources through a firewall server, the method comprising the steps of:

receiving at a network proxy server a request for access to one or more particular network resources, wherein said request includes a user identification code and at least one resource identifier, said network proxy serving being operable at a location remote from the firewall server;

comparing at said network proxy server said received request for access to a relational database containing a stored listing of user identification codes and resource identifiers, wherein each of said resource identifiers corresponds to one or more resources accessible via a network, and said stored listing associates each of said user identification codes with one or more of said resource identifiers, said relational database being operable at a location remote from the firewall server;

executing, via said network proxy server, said request for network access through the firewall server to said one or more particular network resources as a function of said stored listing being indicative of an association between said received user identification code and at least one resource identifier corresponding to said one or more particular network resources.

9. The method of claim 8 wherein the execution of said request for access is performed if said stored listing shows said received user identification code to be associated with at least one resource identifier corresponding to said one or more particular network resources.

10. The method of claim 8 wherein the execution of said request for access is denied if said stored listing shows said received user identification code to be associated with at least one resource identifier corresponding to said one or more particular network resources.

11. The method of claim 8 wherein said network access to said one or more particular resources is effected via a public network.

12. The method of claim 8 wherein each of said user identification codes identifies one or more terminals adapted for facilitating network access to one or more particular network resources.

13. The method of claim 8 wherein each of said user identification codes identifies one or more individuals authorized to access one or more particular network resources.

14. The method of claim 8 wherein each of said resource identifiers corresponds to one or more uniform resource locators for accessing said one or more particular network resources.

* * * * *